US012613518B2

(12) United States Patent
Acharya et al.

(10) Patent No.: US 12,613,518 B2
(45) Date of Patent: Apr. 28, 2026

(54) OPTIMIZING EXECUTION OF MULTIPLE MACHINE LEARNING MODELS OVER A SINGLE EDGE DEVICE

(71) Applicant: Hitachi, Ltd., Tokyo (JP)

(72) Inventors: Joydeep Acharya, Milpitas, CA (US); Hidenori Omiya, Ibaraki (JP); Yusaku Otsuka, Ibaraki (JP); Iori Kobayashi, Ibaraki (JP); Toshiki Shimizu, Ibaraki (JP)

(73) Assignee: HITACHI, LTD., Tokyo (JP)

( * ) Notice: Subject to any disclaimer, the term of this patent is extended or adjusted under 35 U.S.C. 154(b) by 764 days.

(21) Appl. No.: 17/586,021

(22) Filed: Jan. 27, 2022

(65) Prior Publication Data

US 2023/0236589 A1     Jul. 27, 2023

(51) Int. Cl.
*G05B 23/02* (2006.01)
*G05B 13/02* (2006.01)

(52) U.S. Cl.
CPC ..... *G05B 23/0283* (2013.01); *G05B 13/0265* (2013.01); *G05B 23/0221* (2013.01); *G05B 23/024* (2013.01)

(58) Field of Classification Search
CPC ............ G05B 23/0283; G05B 13/0265; G05B 23/0221; G05B 23/024
See application file for complete search history.

(56) References Cited

U.S. PATENT DOCUMENTS

| | | | |
|---|---|---|---|
| 10,169,135 B1 * | 1/2019 | Pandey ............. | G05B 23/0283 |
| 11,054,815 B2 * | 7/2021 | Schulze ............. | G05B 23/0232 |
| 2002/0143417 A1 * | 10/2002 | Ito ..................... | G05B 19/41865 |
| | | | 700/95 |
| 2011/0054806 A1 * | 3/2011 | Goldfine ................. | G07C 3/00 |
| | | | 702/34 |
| 2012/0123699 A1 * | 5/2012 | Kawata ............. | G01N 27/9006 |
| | | | 702/35 |
| 2012/0215450 A1 * | 8/2012 | Ashok ................ | G05B 23/0262 |
| | | | 702/9 |
| 2014/0058705 A1 * | 2/2014 | Brill ..................... | G06Q 10/063 |
| | | | 702/183 |
| 2019/0277913 A1 * | 9/2019 | Honda ............... | G01R 31/2894 |
| 2021/0201164 A1 * | 7/2021 | Sghiouer ............. | H04L 63/1416 |
| 2022/0019863 A1 * | 1/2022 | Iskandar .................. | G06N 3/08 |
| 2022/0221843 A1 * | 7/2022 | Osiroff ............. | G05B 19/41845 |

* cited by examiner

*Primary Examiner* — Raymond L Nimox
(74) *Attorney, Agent, or Firm* — PROCOPIO, CORY, HARGREAVES & SAVITCH LLP

(57) ABSTRACT

Systems and methods described herein can involve management of a system having a plurality of sensors, the plurality of sensors observing a plurality of process steps, which can involve selecting a subset of the plurality of sensors for observation; executing anomaly detection from data provided from the subset of the plurality of sensors; for a detection of an anomaly from a sensor from the subset of sensors, selecting ones of the plurality of process steps based on the detected anomaly; estimating a probability of anomaly occurrence for the selected ones of the plurality of process steps; and for the estimated probability of anomaly occurrence meeting a predetermined criteria, selecting ones of the plurality of sensors associated with the selected ones of the plurality of process steps for observation.

18 Claims, 17 Drawing Sheets

|            | Time=0              | Time=Ts             | Time=2Ts            | Time=3Ts            |
|------------|---------------------|---------------------|---------------------|---------------------|
| Process X₁ | Part 001 product X  | Part 002 product X  | Part 003 product X  | Part 004 product X  |
| Process X₂ | None                | Part 001 product X  | Part 002 product X  | Part 003 product X  |
| Process X₃ | None                | None                | Part 001 product X  | Part 002 product X  |

FIG. 2

| ID 301 | Data Source 302 | Container ID 303 | Container Name 304 | Date Created 305 | Size 306 | Container 307 |
|---|---|---|---|---|---|---|
| 1 | 121 | aaaaa | ML-model-<process-id-1> | xx/yy/zzzz | 10 GB | <dir>/<dir>/.. |
| 2 | 122 | bbbbb | ML-model-<process-id-2> | xx/yy/zzzz | 10 GB | <dir>/<dir>/.. |
| 3 | 122 | ccccc | ML-model-<process-id-3> | xx/yy/zzzz | 10 GB | <dir>/<dir>/.. |
| .. | .. | | | | | |

FIG. 4

| | Key | | Value | |
|---|---|---|---|---|
| Part ID | Data Acquisition Time | Data Source | Data Source | Stored Value |
| part001 | <T0 + nTs, T0 + (n+1)Ts> | 121 | | <dir>/<dir> /... |
| part002 | <T0 + nTs, T0 + (n+1)Ts> | 122 | | <dir>/<dir> /... |
| part003 | <T0 + nTs, T0 + (n+1)Ts> | 123 | | <dir>/<dir> /... |
| | | ∙∙ | | |

| Part ID | Data Acquisition Time | Data Source | Stored Value |
|---------|----------------------|-------------|--------------|
| | Key | Value | |
| 403 | 404 / 401 | 405 / 402 | 406 |
| part001 | <T0 + nTs, T0 + (n+1)Ts> | 121 | <dir>/<dir> /... |
| part002 | <T0 + nTs, T0 + (n+1)Ts> | 122 | <dir>/<dir> /... |
| part001 | <T0 + (n+1)Ts, T0 + (n+2)Ts> | 122 | <dir>/<dir> /... |
| | | .. | |

FIG. 6

OPTIMIZING EXECUTION OF MULTIPLE MACHINE LEARNING MODELS OVER A SINGLE EDGE DEVICE

BACKGROUND

Field

The present disclosure is generally directed to manufacturing systems, and more specifically, to optimizing execution of machine learning models over an edge device.

Related Art

Ensuring a good quality of manufactured products is one of the key requirements in factories. The quality check process depends on the type of manufacturing. For discrete manufacturing, the part to be manufactured moves through an assembly line or from line to line. As the part moves through a line, it goes through various processes wherein each process performs a specific manufacturing task. Each process can be implemented by machine or by manual human operations, and there can be a quality issue (e.g., defect or errors) in the output of each process. For many types of discrete manufacturing, errors are determined by optical inspection or some similar type of image analytics-based quality check. This is usually done after the final process or at a few intermediate processes that are fixed.

While this error check methodology is easy to install and operate, it has an obvious shortcoming. If an error is introduced in a process, it is detected only after a subsequent process that has the image-based quality check. However, an earlier detection of errors would have helped to provide a quicker diagnosis and also prevent unnecessary propagation of a defective part down the line.

SUMMARY

There are several direct ways to address the issues in related art quality check systems. One method can involve installation of sensors (including but not limited to cameras) after each process and use several edge gateways (GWs) or a cloud solution to analyze all the data to catch an error as soon as it occurs. However, such an implementation is costly. Also, such an implementation is a brute force approach that does not consider details such as the apriori probability of a process leading to an error. Such information is part of the operational technology (OT) domain knowledge which, if captured, can lead to a more intelligent solution. Example implementations described herein are directed to such an approach that takes into account apriori probability of a process.

In example implementations described herein, there is a system and method with sensors that observe the parts passing through multiple manufacturing processes and intelligently selects a subset of sensors to observe if there is error in the part monitored by such sensors. When observing the error atone process, it estimates the probability of an error occurring in each process. Finally, when the estimated probability of anomaly of the certain process is more than the predetermined criteria, it starts observing that process instead.

Aspects of the present disclosure involve a method for a system involving a plurality of sensors, the plurality of sensors observing a plurality of process steps, the method involving selecting a subset of the plurality of sensors for observation; executing anomaly detection from data provided from the subset of the plurality of sensors; for a detection of an anomaly from a sensor from the subset of sensors, selecting ones of the plurality of process steps based on the detected anomaly; estimating a probability of anomaly occurrence for the selected ones of the plurality of process steps; and for the estimated probability of anomaly occurrence meeting a predetermined criteria, selecting ones of the plurality of sensors associated with the selected ones of the plurality of process steps for observation.

Aspects of the present disclosure involve a computer program having instructions for a system involving a plurality of sensors, the plurality of sensors observing a plurality of process steps, the instructions involving selecting a subset of the plurality of sensors for observation; executing anomaly detection from data provided from the subset of the plurality of sensors; for a detection of an anomaly from a sensor from the subset of sensors, selecting ones of the plurality of process steps based on the detected anomaly, estimating a probability of anomaly occurrence for the selected ones of the plurality of process steps; and for the estimated probability of anomaly occurrence meeting a predetermined criteria, selecting ones of the plurality of sensors associated with the selected ones of the plurality of process steps for observation.

Aspects of the present disclosure involve a system involving a plurality of sensors, the plurality of sensors observing a plurality of process steps, means for selecting a subset of the plurality of sensors for observation; means for executing anomaly detection from data provided from the subset of the plurality of sensors; for a detection of an anomaly from a sensor from the subset of sensors, means for selecting ones of the plurality of process steps based on the detected anomaly; estimating a probability of anomaly occurrence for the selected ones of the plurality of process steps; and for the estimated probability of anomaly occurrence meeting a predetermined criteria, means for selecting ones of the plurality of sensors associated with the selected ones of the plurality of process steps for observation.

Aspects of the present disclosure involve an apparatus managing a system involving a plurality of sensors, the plurality of sensors observing a plurality of process steps, the apparatus involving a processor configured to load instructions from memory and execute the process of selecting a subset of the plurality of sensors for observation; executing anomaly detection from data provided from the subset of the plurality of sensors; for a detection of an anomaly from a sensor from the subset of sensors, selecting ones of the plurality of process steps based on the detected anomaly, estimating a probability of anomaly occurrence for the selected ones of the plurality of process steps; and for the estimated probability of anomaly occurrence meeting a predetermined criteria, selecting ones of the plurality of sensors associated with the selected ones of the plurality of process steps for observation.

BRIEF DESCRIPTION OF DRAWINGS

FIG. 2 illustrates an example arrival of parts in various processes over time, in accordance with an example implementation.

FIG. 4 illustrates an example of the ML model repository, in accordance with an example implementation.

FIG. 5 illustrates an example of data in sensor database for a time interval starting at nTs after the start T0, in accordance with an example implementation.

FIG. 6 illustrates an example sensor database for a time interval starting at (n+1)Ts after the start T0, in accordance with an example implementation.

DETAILED DESCRIPTION

Figure 1:
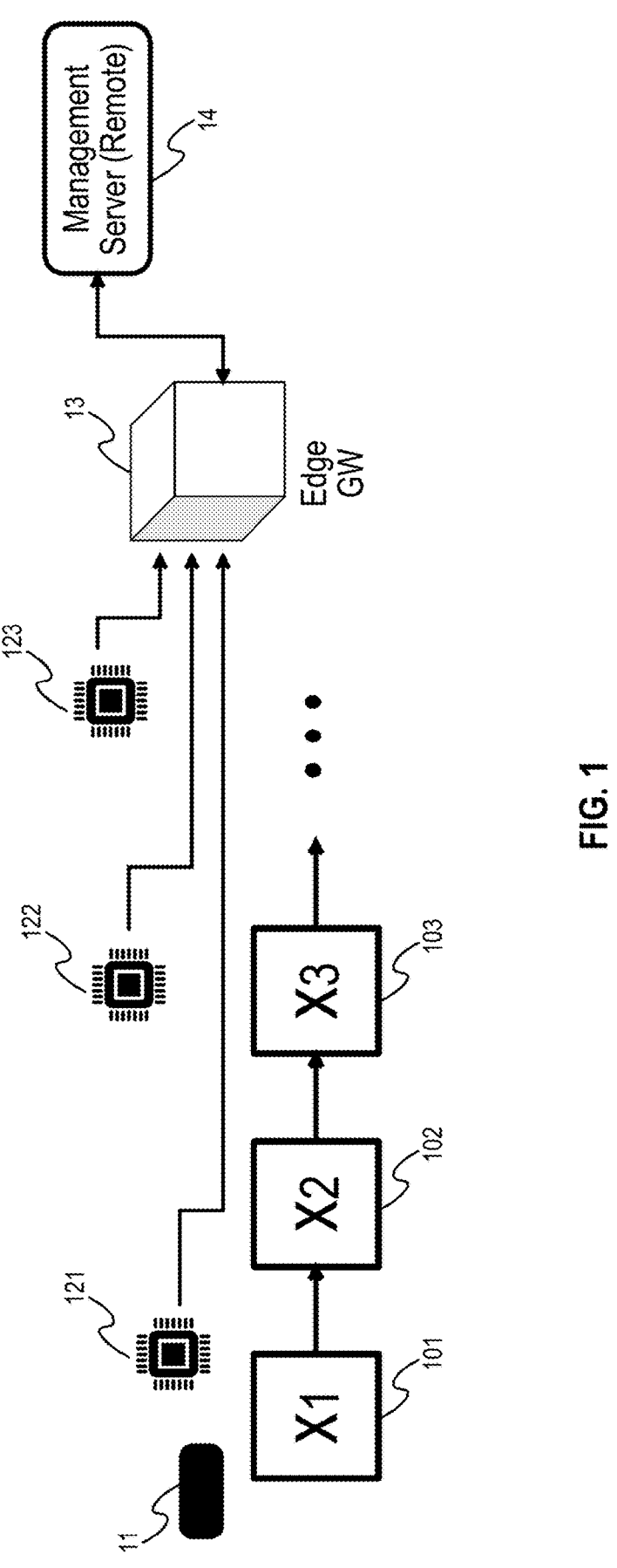
FIG. 1 illustrates a deployment overview of the proposed system, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In example implementations described herein, there is a system and method having sensors observing each of a plurality of step outcomes, wherein some sensors are selected to observe an anomaly. When an anomaly is detected from one of the selected sensors, the systems and methods estimate the probability of anomaly of each of the plurality of process steps, and when the estimated probability of the anomaly of a particular step is more than the predetermined criteria, the systems and methods start observing that step instead.

FIG. 1 illustrates a deployment overview of the proposed system, in accordance with an example implementation. A sample part of product 11 moves through a series of processes $X_1$ 101, $X_2$ 102, $X_3$ 103, and so on. After each process, there is a corresponding monitoring composite sensor (i.e. sensor 121 monitoring process $X_1$ 101, sensor 122 monitoring process $X_2$ 102, sensor 123 monitoring process $X_3$ 103). Note here the term 'sensor' is used to denote the aggregated value from multiple sensors which include, but are not limited to, cameras. Assume that for each process step, a new part of product 11 arrives every $T_S$ seconds at the initial process $X_1$ and parts already present in a process move to the next process.

An example is shown in FIG. 2, which illustrates an example arrival of parts in various processes over time, in accordance with an example implementation. In any time interval $T_S$ (process step), the data from all sensors are collected at an edge GW 13. The edge GW 13 performs machine learning/artificial intelligence (ML/AI) based inference to detect quality issues or errors and this has to be completed during the interval $T_S$. For example, in FIG. 2 at time 3 $T_S$, the Edge GW has sensor data from part 004 at $X_1$, part 003 at $X_2$ and 002 at $X_3$. As the goal is to provide a cost-effective solution, it is presumed that large number of sensors are connected to this single edge GW. This also means that the edge GW cannot analyze data from all sensors in the same time interval.

In accordance with the example implementations, the edge GW 13 receives the data from all sensors 121, 122, 123, etc., and dynamically select a subset of sensors for observation such as to perform error checking/anomaly detection. For example, if sensor 122 is selected, it means that when a part is at process $X_2$, the data provided from the sensor 122 shall be inspected for quality issues via execution of anomaly detection. The selection of which sensors (and corresponding processes) to select based on an estimation of which processes are most likely to be in error. Over time, the proposed system and method will ensure that errors are captured with minimum delay after their occurrence.

In the example implementations as described herein, if an anomaly or error is detected from one or more of the subset of the sensors, then the process steps associated with the anomaly are selected, whereupon the probability of anomaly occurrence is estimated for the selected process steps. If such an estimated probability of occurrence meets a predetermined criteria, then the sensors associated with such selected process steps (e.g., another subset) will be used for the observation at the next iteration. As will be described herein, the predetermined criteria can be based on a threshold, can be selected based on having the highest probability, and so on in accordance with the desired implementation. As the edge GW 121 tends to have limited computing resources, depending on the desired implementation, the edge GW 121 can also stop the observation of data from the previous subset of the plurality of sensors and use the another subset of sensors for observation.

Thus, even with one processing entity (the edge GW), better performance can be achieved in comparison to the related art systems that naively perform inspection at fixed processes which may not be the processes which are most likely to be in error. The processes that are most likely to be in error are not static, or else such processes can simply be selected. The example implementations described herein utilize a combination of static apriori information from domain knowledge and dynamic shop floor conditions (e.g. machine malfunction, shift change, new inexperienced worker etc.) to dynamically assess the processes in error.

The edge GW 13 communicates with a remote management server 14 periodically to obtain important management and orchestration instructions such as which processes to select for error check, and so on. The high bandwidth sensor data resides at the edge GW 13 so as to be local and remove the need to transmit to the remote server 14, thus saving cost.

Further, through such example implementations, the required computing resources for processing sensor data by limiting the number of sensors to a subset of sensors from which data is to be processed for observation. Non-selected sensors can be kept active in accordance with the desired implementation, or can be turned off to reduce the number of active sensors to save on resources in accordance with the desired implementation. In such a manner, the limited resources of an edge GW can be managed properly while utilizing an efficient subset of sensors managed by the edge GW for observation.

Figure 3:
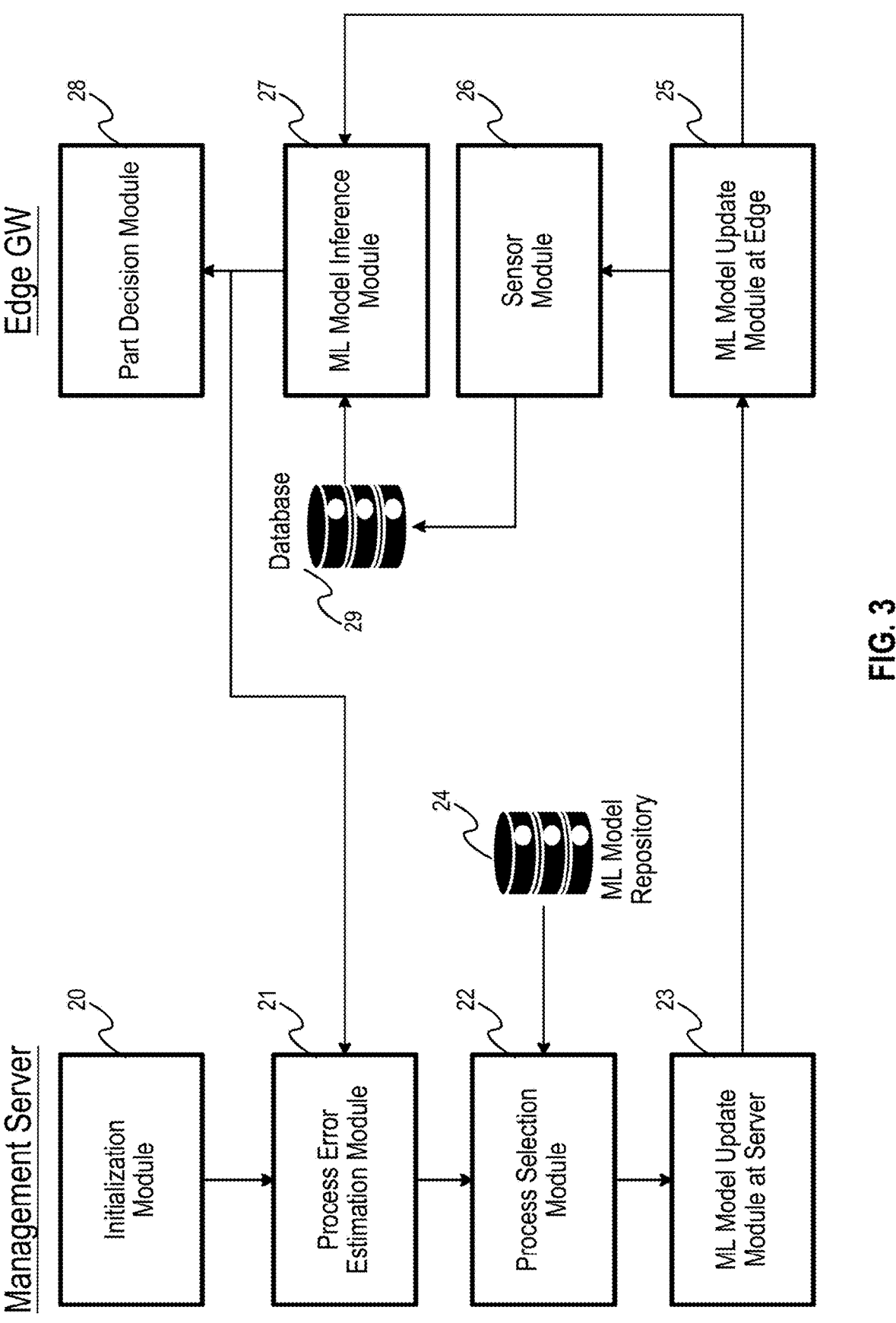
FIG. 3 illustrates an example block diagram of the proposed system architecture, in accordance with an example implementation.

FIG. 3 illustrates an example block diagram of the proposed system architecture, in accordance with an example implementation. The block diagram of the proposed system is shown in FIG. 3 captures the interaction between the management server 14 and edge GW 13. The management server 14, can include the following modules.

Initialization module 20 initializes important system parameters which will be described herein. The initialization module 20 defines the behavior of the system at startup such as which processes should be picked such that the ML/AI based error check will be performed on their sensor data.

Process error estimation module 21 observes the inference result (from the ML model inference module 27 of the edge GW) for each process that has currently been picked which, at each time interval $T_S$. If there is an error observed, it estimates in which process (up to and including the process where error was observed), the error was most likely to occur. If there am additional resources at the edge GW to perform inference, then sensor values from additional processes may be analyzed.

Process selection module 22 selects new processes that should be picked so that the ML/AI model based error/anomaly check will be performed on their sensor data. This is based on the estimation of which processes are most likely to be in error from the process error estimation module 21.

ML model update module 23 at server sends an updated ML model at the corresponding module ML model update module 25 at edge. The ML models perform the inference to determine the quality errors or anomalies in the parts. There can be multiple approaches to realizing this operation. The most common is ML model orchestration by Kubernetes where the ML models are packaged as docker containers and shipped from ML model update module 23 at server to the ML model update module 25 at edge.

The ML model repository 24 stores several different ML models that are trained on the sensor data from all possible sensors 121, 122, 123, and so on. It is presumed that the training has been done in advance in accordance with any desired implementation as known in the art. FIG. 4 illustrates an example of the ML model repository, in accordance with an example implementation. Depending on the desired implementation, the ML model repository can be in tabular form where each row is the identifier (ID) 301 of a different ML model and each column contains the details of the model. Such details are the respective data source 302 which identifies the sensor whose data is being used for training, the ID 303 of the container which is assigned during the generation process (note that technically what is stored in the model repository is the container image and not the actual running container), the name 304 of the container which can be descriptive to identify the data source or the process it is monitoring, the date created 305, the size 306 when the container will be deployed, and the actual container image (the ML model) 307.

The edge GW 13 involves the following modules. ML model update module 25 at edge 25, which receives one or more ML model information from the ML model update module 23 at server at regular intervals and executes the model 307 for the data source identified in 302.

The sensor module 26, which controls sensor switching and acquires data from the sensors 121, 122, 123 etc. This module shall have the libraries and device drivers to connect to the analog data from the sensors, cleanse and covert them to a formal that can be analyzed subsequently for machine learning.

A database 29 is used for temporarily storing the sensor values for each time interval $T_S$, in the form of data illustrated in FIG. 5 and FIG. 6. FIG. 5 illustrates an example of data in sensor database 29, for a time interval starting at nTs after the start T0. The example of FIG. 5 is with respect to how the data of this database 29 can look during a given time interval from $T0+nT_S$ to $T0+(n+1)T_S$, where T0 is some start instant (for e.g. where this system started getting operational) and $T_S$, as explained earlier was the time after which a new part will arrive at the assembly line. The table is indexed by key field 401 which includes the ID of the part, 403 and the time interval, 404. The data part of the table 402 includes the data source 405, which records data for the part 403 and the actual sensor data 406. Note that this database is updated every Ts.

FIG. 6 illustrates an example sensor database for a time interval starting at (n+1)Ts after the start T0, in accordance with an example implementation. Specifically, FIG. 6 illustrates how the database evolves in the next interval.

As shown in FIG. 6, at each new instant, some of the old entries may be deleted to store the current ones. This depends on the resources at the edge GW. Example implementations described herein are targeted towards resource constrained edge GWs and hence the assumption is that it may not be possible to manage a database with large storage capacity at the edge GW. It may also be that there is no resources for a database at all, however, the example implementations as described herein can be modified accordingly.

The ML model inference module, 27, which takes as input the sensor data(s) from the database 29 and the corresponding ML model from the ML model update module 25 at edge and performs the inference. The results of this inference (i.e. presence/absence of quality error) is fed back to the process error estimation module 21 from the management server.

The part decision module 28 decides on how to handle a part based on the ML model inference module 27. If there is a quality issue, then the part is discarded or pushed to a secondary inspection line as per the policy of the factory, or as per the desired implementation. If there is no issue, then it is pushed to the next process after $T_S$ time.

Figure 7:
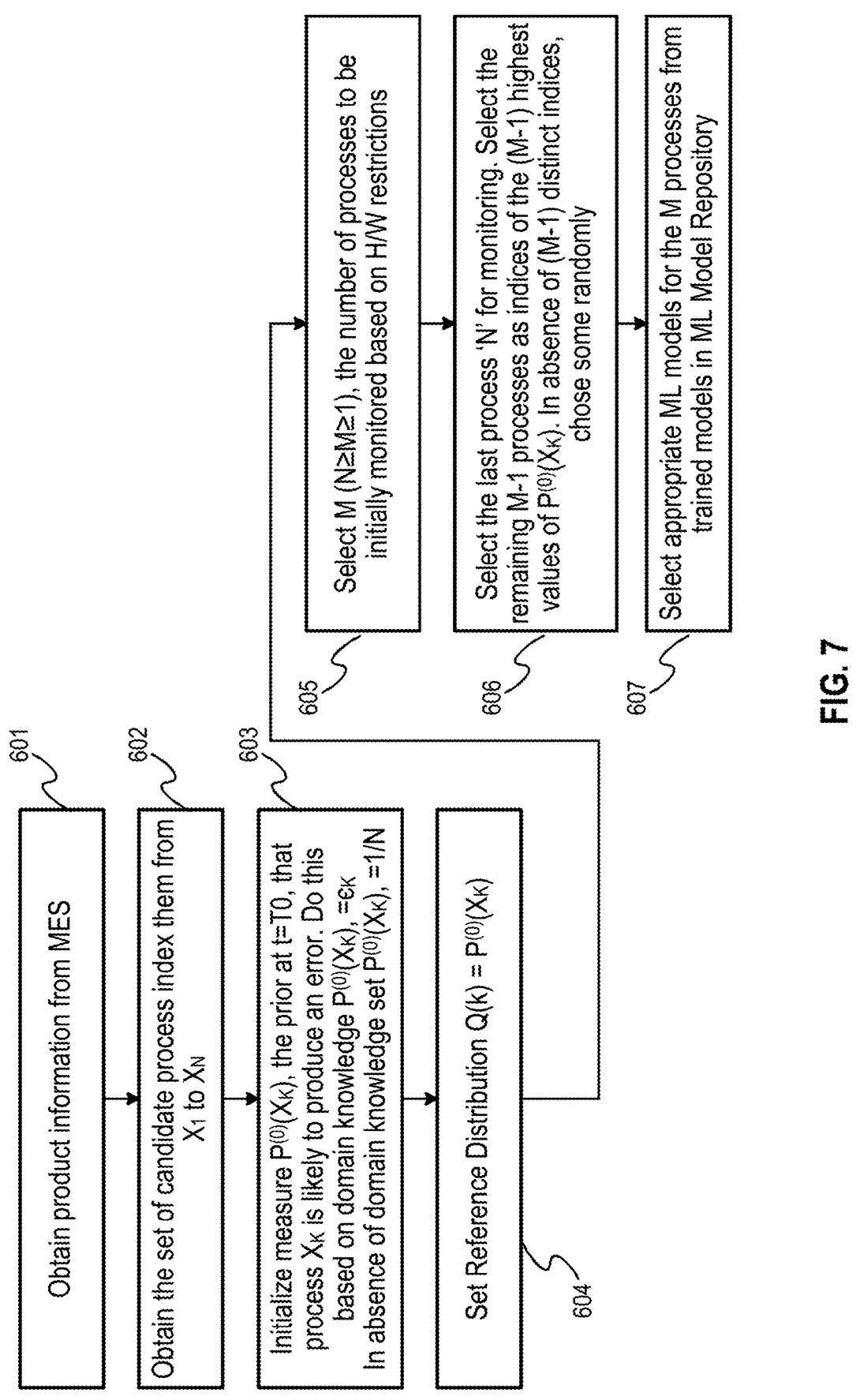
FIG. 7 illustrates details of the initialization module, in accordance with an example implementation.

FIG. 7 illustrates details of the initialization module, in accordance with an example implementation. The initialization module 20 involves the following flow.

At 601, the product information from Manufacturing Execution System (MES). This tells us at what interval TS, the parts of that product will arrive. It tells how to select the ML models that are relevant to detecting quality issues for that product. It also gives information about the processes that the product has to go through, as described at 602.

At 602, the set of processes that the part identified in 601 are obtained, and will pass through and index them from $X_1$ to $X_N$, where N denotes the total number of processes for that product. These processes may vary from product to product.

At 603, the flow initializes the measure $P(0)(X_K)$ for all K from 1 to N, which captures the belief that if a quality error is to occur, it will be due to process $X_K$. This can be assigned based on domain knowledge obtained from factory operators. In the absence of domain knowledge, one possible implementation would be set the values to 1/N. For the special case, when P(0)(X$_K$) is considered to be a probability measure, then there is a need to additionally ensure that 0≤P(0)(X$_K$)≤1 and $$\sum_{k \le N} P^{(0)}(X_k) = 1$$

At 604, the flow defines a reference distribution Q(K) which shall be used later in the process selection module 22, the details of which will be described herein.

At 605, the flow decides the number of processes M from the N processes which shall be initially monitored. This means that the values from their sensors will be passed to the ML model inference module. Recall that the example implementations are geared towards a resource constrained edge GW which cannot analyze the data from all the N sensors during a time interval. The selection of the processes M can also be restricted based on the available computing resources.

Depending on the desired implementation, the selection of the number of process steps can be restricted based on the available computing resources. For example, if the edge GW can only observe up to a set number of processes based on its available computing resources, then the number of processes M can be set to that number in accordance with the desired implementation. Similarly, if the edge GW only has the available computing resources to observe up to a certain number of sensors, the sensors from those processes M can be restricted to a specific number in accordance with the desired implementation.

At 606, the identity of these M processes is decided, where M was selected in 605. The last process N is selected, because if an error occurs in this process, it cannot otherwise be detected. Further, in most baseline current systems, this is the process that is selected and thus it is simpler to evaluate how well the system performs. The remaining M−1 processes are selected as the M−1 top entries of the measure P(0)(X$_K$). If there are not M−1 unique values of P(0)(X$_K$) (as would be the case when they are all initialized to 1/N), then chose the M−1 processes randomly.

At 607, the flow selects the appropriate ML models for the product identified in 601 and the M data sources identified in 606. Note that the flow at 606 identifies the processes to be monitored which has a direct correspondence with the data sources.

Figure 8:
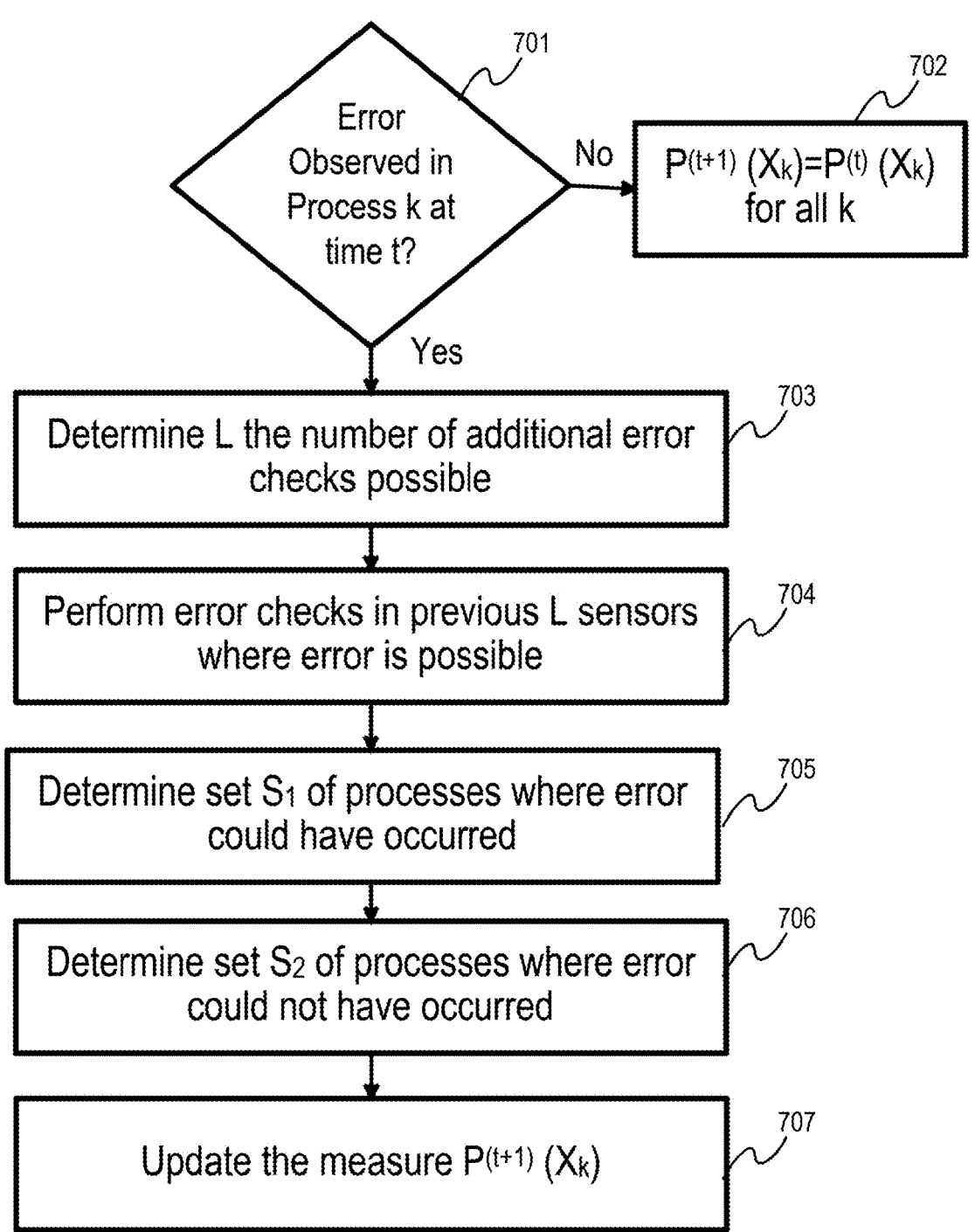
FIG. 8 illustrates the process error estimation module, in accordance with an example implementation.

FIG. 8 illustrates the process error estimation module 21, in accordance with an example implementation. The details of the process error estimation module 21 as shown in FIG. 8 are as follows.

At 701, the flow observes at time t whether an error has occurred in a part that is in process X$_K$. This flow is executed for all processes K from 1 to N (i.e. for all the different parts that are in these different processes), by reading the inference results from ML model inference module 27. Note that here t increases in discrete process steps of T$_S$.

If there is no error, then at 702, the flow simply retains the probabilities at the preceding interval. i.e. P$^{(t+1)}$(X$_K$)=P$^{(t)}$(X$_K$).

If there is an error observed in a part that is in process X$_K$ at time t, it does not mean that the error occurred in that part, at process X$_K$ at time t. It is possible that the error occurred when the part was previously in some other process and was not detected then since data from all sensors were not being analyzed. The basic premise of the resource constrained edge GW is that the number of processes being monitored 'M' is less than the total number of processes N as explained in the flow of 605.

At 703, the flow first determines the number of additional processes L, whose data can be checked for the source of the error within the T$_S$ duration, before the arrival of a new part. This depends on the resources available at the edge GW. Note that for edge GWs whose resources do not support additional processing, this flow can be omitted as needed to facilitate the desired implementation.

At 704, the flow chooses L processes whose data should be analyzed. First, the flow considers all possible processes where the error could have happened by concatenating the possibilities over all analyzed sensor values. The flow determines the ID of the part which is in error and the time instants where the error could have occurred. The flow also checks if there is data corresponding to that part ID during that time interval that is stored in sensor database 29. Then, the flow picks L part IDs and time intervals based on heuristics. Moreover, as noted at 703, for the edge GWs whose resources do not support additional processing, this flow can be omitted without affecting the operation of the remaining portions in accordance with the desired implementation.

At 705, the flow determines the set of processes S1 where the error could have occurred. At 706, the flow determines the set of processes S2 where the error could not have occurred. At 707, the flow updates the measures P$^{(t+1)}$(X$_K$) for sets S1 and S2 separately. There can be multiple ways of doing performing this flow. In a first example, the measure P$^{(t+1)}$(X$_K$) is increased for each value of X$_K$ in set S1. For example, P$^{(t+1)}$(X$_K$)=P$^{(t)}$(X$_K$)+D, when X$_K$ belongs to S1 or P$^{(t+1)}$(X$_K$)=ρ*P$^{(t)}$(X$_K$) when X$_K$ belongs to S1, where D and ρ are system constants that can be defined during initialization phase 20.

In a second example, P$^{(t)}$(X$_K$) is considered to be the probability measure at each time instant t. In this case, the example implementations ensure that 0≤P$^{(t)}$(X$_K$)≤1 and $$\sum_{k \le N} P^{(t)}(X_k) = 1$$

for all t. Note that the flow at 603 ensures this is true for the initial time step. So, for time t+1, it is not enough to increase the probabilities P$^{(t)}$(X$_K$) in set S1, but the probabilities must also decrease in set S2 as well. To do this, the flow first determines a suitable probability mass Δ, that can be transferred from set S1 to set S2. The criterion to determine Δ is that after the transfer all probabilities should still lie between 0 and 1. It can be shown that this can be achieved by the following equations, where |S| is the cardinality (number of entries) in set S.

$$\Delta = \min(A, B)$$

$$A = |S|\left(1 - \max_{k \in S1} P^{(t)}(X_k)\right)$$

$$B = |S2|\min_{k \in S2} P^{(t)}(X_k)$$

After this, the flow computes the new probabilities as

P$^{(t+1)}$(X$_k$)=P$^{(t)}$(X$_k$)+Δ/|S1| for all X$_K$ in the set S1

P$^{(t+1)}$(X$_k$)=P$^{(t)}$(X$_k$)−Δ/|S2| for all X$_K$ in the set S2

Figure 9:
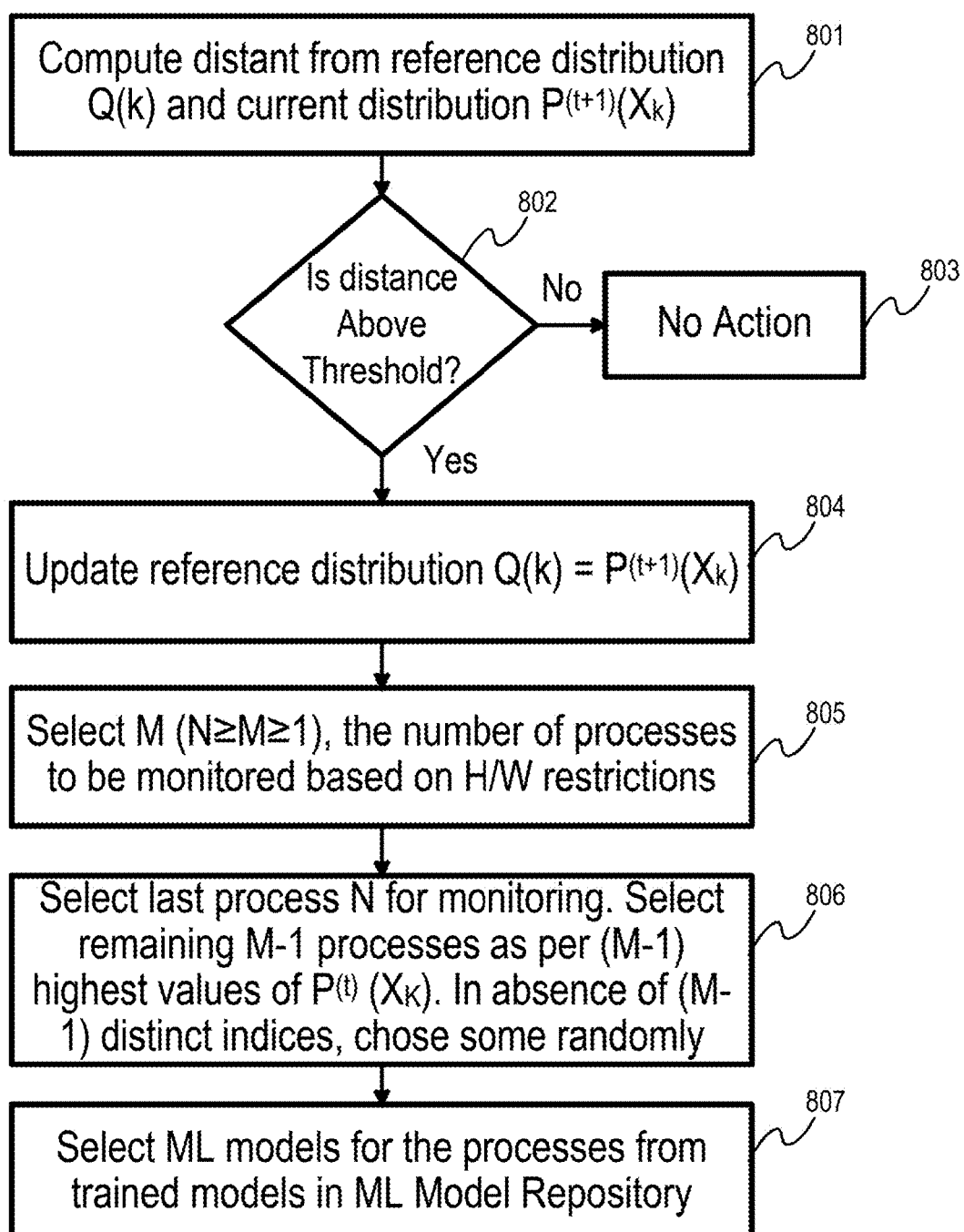
FIG. 9 illustrates an example flow for the process selection module, in accordance with an example implementation.

As explained above, the selection of the process steps based on the detected anomaly is conducted based on the process lines associated with the sensors from which the anomaly is detected, as well as any process ordering that is based on how the processes have been deployed. Such relationships can be provided from the factory operator or derived from the arrival information as illustrated in FIG. 2. The relevance of each of such factors are expressed in the form of distance such as statistical distance. Next, the details of the process selection module 22 of FIG. 9 are as follows.

At 801, at time t, the flow compares the distance between the measures Q(k) and $P^{(t+1)}(X_K)$. There could be many different ways to compute the distance that are mentioned in prior art. For example, such computations can involve but is not limited to, mean squared difference between the vectors Q(k) and $P^{(t)}(X_K)$. Another example for probability measures can involve the application of the Kullback Leibler distance. In another example, another way to compute distance could be to look at individual values of $P^{(t)}(X_K)$ and see for one or more values of 'k' and compute distance as a function of the values $|Q(k)-P^{(t)}(X_K)|$ for all these values 'k'. This is different from the other examples which involve looking at the entire distribution together.

At 802, the flow determines if this distance is above a pre-determined threshold as defined in the Initialization Module 20. If the answer to 802 is no, then the flow does nothing as shown at 803. If the answer to 802 is yes, then at 804, the flow updates the reference distribution to Q(k)= $P^{(t+1)}(X_K)$.

The flow at 805, 806 and 807 are similar to the flow at 605, 606 and 607 that were performed during initialization, but are now performed at time t.

At 805, the flow decides the number of processes M from the N processes which shall be monitored. This means that the values from their sensors will be passed to the ML model inference nodule.

At 806, the flow decides the identity of these M processes, where M was selected in 805. As in the flow at 606, the last or final process N is always selected. The remaining M–1 processes are selected as the M–1 top entries of the measure $P^{(t+1)}(X_K)$. If there are not M–1 unique values of $P^{(t+1)}(X_K)$, then the flow chooses the M–1 processes randomly.

At 807, the flow selects the appropriate ML models for the product identified in the flow at 601 and the M data sources identified in the flow at 806.

Figure 10:
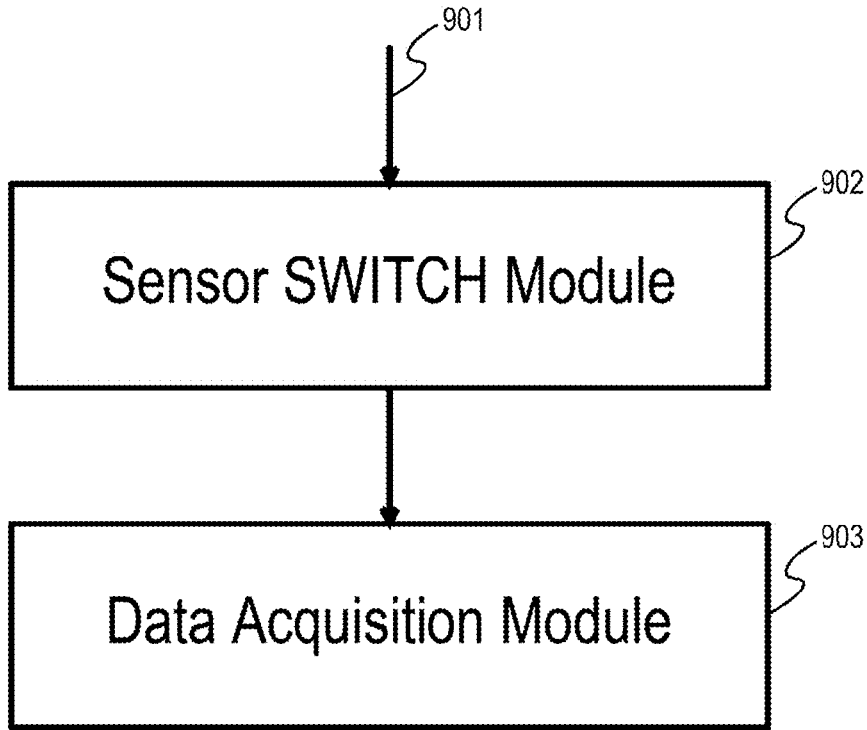
FIG. 10 illustrates the flow of the sensor module, in accordance with an example implementation.

FIG. 10 illustrates the flow of the sensor module, in accordance with an example implementation. In the example of the sensor module 26 as shown in FIG. 10, the following flow is performed.

Signal 901 comes from the ML model update nodule 25 at edge. Signal 901 contains information about which sensors are active. A sensor is determined to be active if there is a ML model obtained by ML model update module 25 at edge which is executed on the data of that sensor. If there are no ML models in the ML model update module 25 at edge that are executed on the data of a sensor, then that sensor is determined to be inactive.

At any time period, the sensor switch module shown in the flow at 902, can switch off some (or al) of the sensors that are inactive for the time period, but had been active for the previous time period. Similarly, it can switch on some sensors that are active for the time period, but had been inactive for previous time period.

The data acquisition module 903 then performs data acquisition from al sensors that are switched on. This module shall have the libraries and device drivers to connect to the analog data from the sensors, cleanse and covert them to a formal that can be analyzed subsequently for machine learning.

Figure 11:
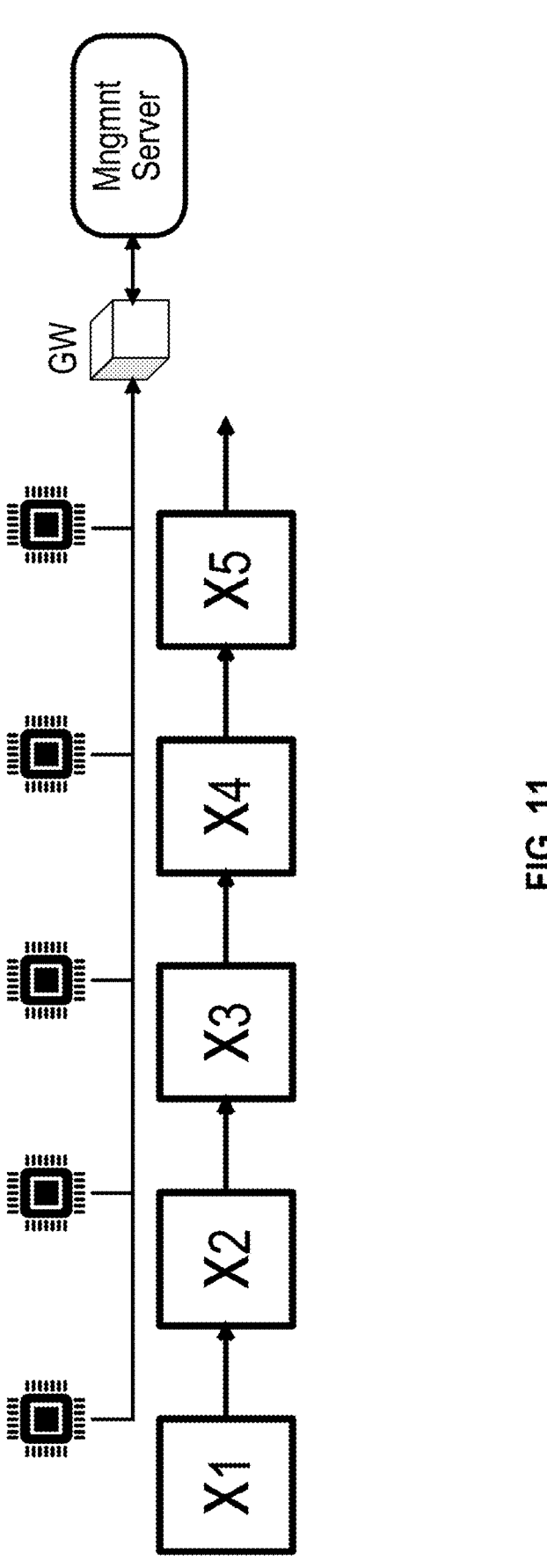
FIGS. 11, 12, and 13 illustrate an example of an initial system, in accordance with an example implementation.
Figure 12:
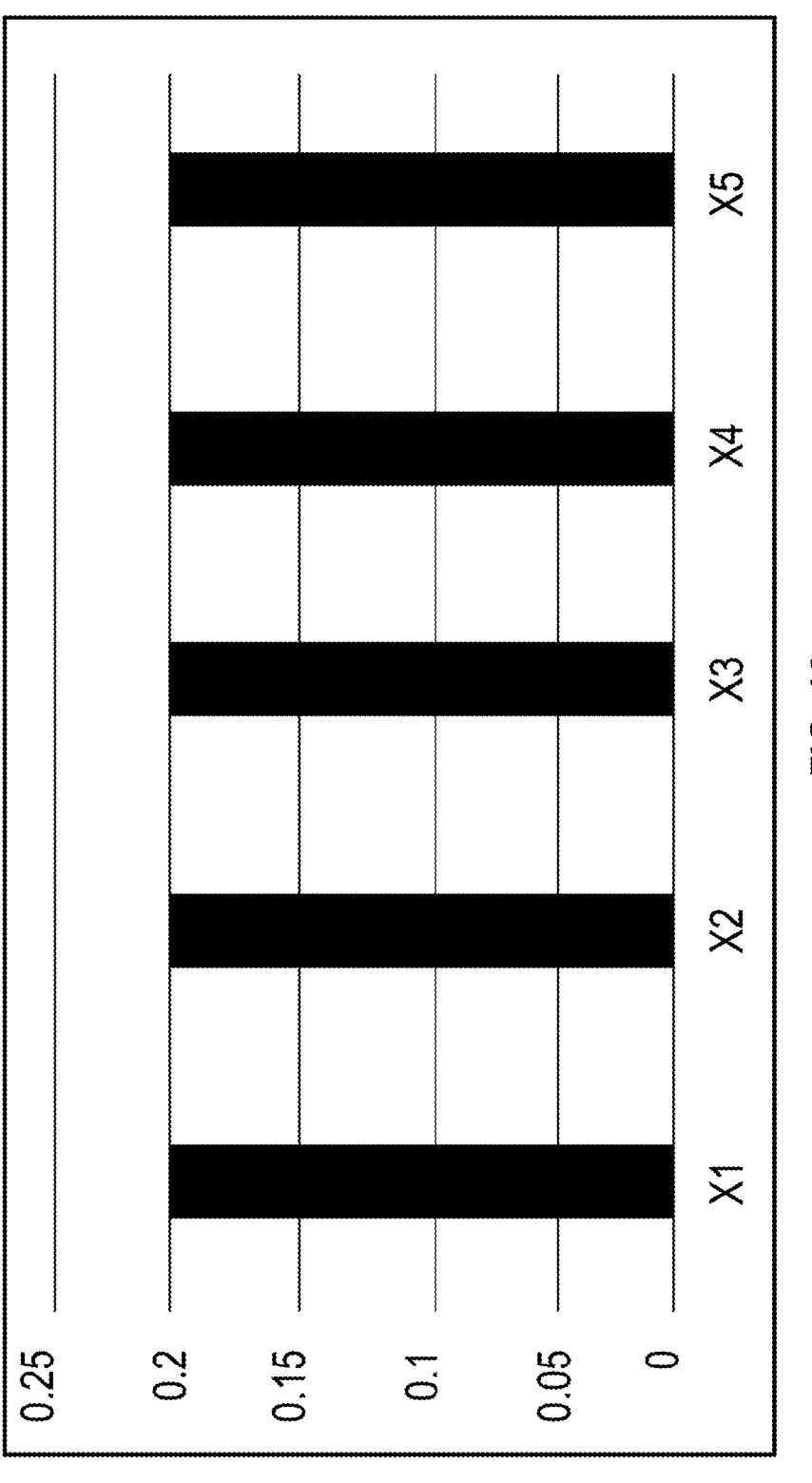
Figure 13:
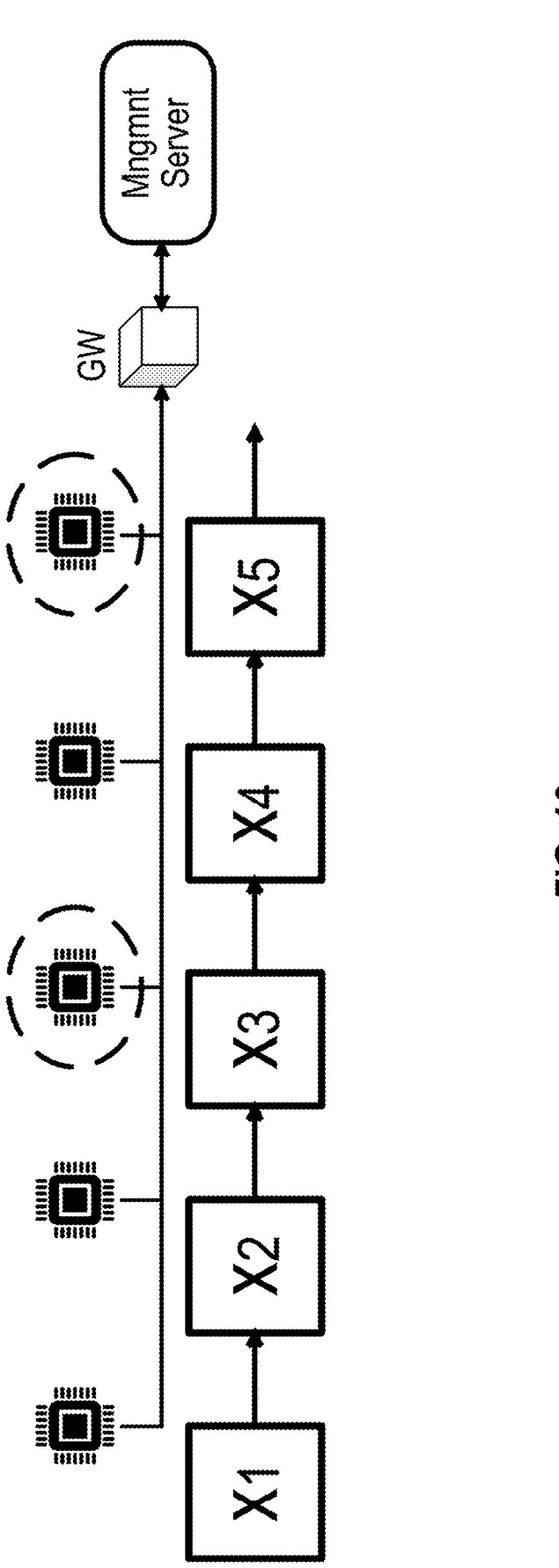

FIGS. 11, 12, and 13 illustrate an example of an initial system, in accordance with an example implementation. To illustrate the working of the proposed system, consider a simple example shown in FIG. 11 where there are five processes to be monitored. The working of the various modules can be shown to be as follows.

The initialization module, 20, initializes $P^{(0)}(X_K)$, and a probability measure is assumed. Then this will be as shown in FIG. 12 where $P^{(0)}(X_K)$=0.2 for all K. Say we determine M=2. Select $X_5$ and then remaining M–1=1 process for initial monitoring. Since all $P^{(0)}(X_K)$ are same, this choice is made randomly. Say $X_3$ is chosen. This is shown in the example of FIG. 13. The example implementations choose an ML model that was trained on data from sensors at $X_3$ and $X_5$ for detecting quality errors at processes $X_3$ and $X_5$. The ML model update module 23 at server updates these models to the ML model update module 25 at edge.

The edge GW 13 performs data acquisition and inference periodically every $T_S$ seconds. The results of the inference are passed to the management server's process error estimation module 21 which tries to estimate where the error could have occurred. For example, if an error is observed in a part when it was in $X_3$, the error could have occurred when the part was in $X_1$ or $X_2$ or $X_3$. If an error is observed in a part when it was in $X_5$, then the error could have occurred in when the part was in $X_4$ or $X_5$ but not when it was in $X_1$ to $X_3$ as the part passed the error check when it was in $X_3$. Thus, in the latter example, when selecting the process steps based on the detected anomaly or error, the process step in which the error or anomaly is detected is selected ($X_5$), as well as every unobserved prior process step from which there was no observation made (e.g., due to not monitoring the corresponding sensors of the process) ($X_4$), up to the previously observed process step ($X_3$).

The edge GW 13 performs data acquisition and inference, periodically every $T_S$ seconds. The results of the inference are passed to the management servers process error estimation module 21 which tries to estimate where the error could have occurred. For example, if an error is observed in a part when it was in $X_3$, the error could have occurred when the part was in $X_1$ or $X_2$ or $X_3$. If an error is observed in a part when it was in $X_5$, then the error could have occurred in when the part was in $X_4$ or $X_5$ but not when it was in $X_1$ to $X_3$ as the part passed the error check when it was in $X_3$.

To understand the effect of additional processing, consider the case when error is observed in $X_3$ for a part and consider that L=1 is the additional resource at the edge GW. In this case, a check to the database is made to see if the image for the same part is stored when it was in $X_1$ or $X_2$. If so, the process error estimation module 21 picks up the one image that is present (or randomly one of them when both are present) and perform inference. Accordingly, it is possible to select the process steps based on anomaly detection on stored sensor data in memory or in database. Such example implementations can be conducted, for example, for destaged data to disk drive in the edge GW for lower priority sensor data, for stored unprocessed sensor data in cache, and so on depending on the desired implementation.

Figure 14:
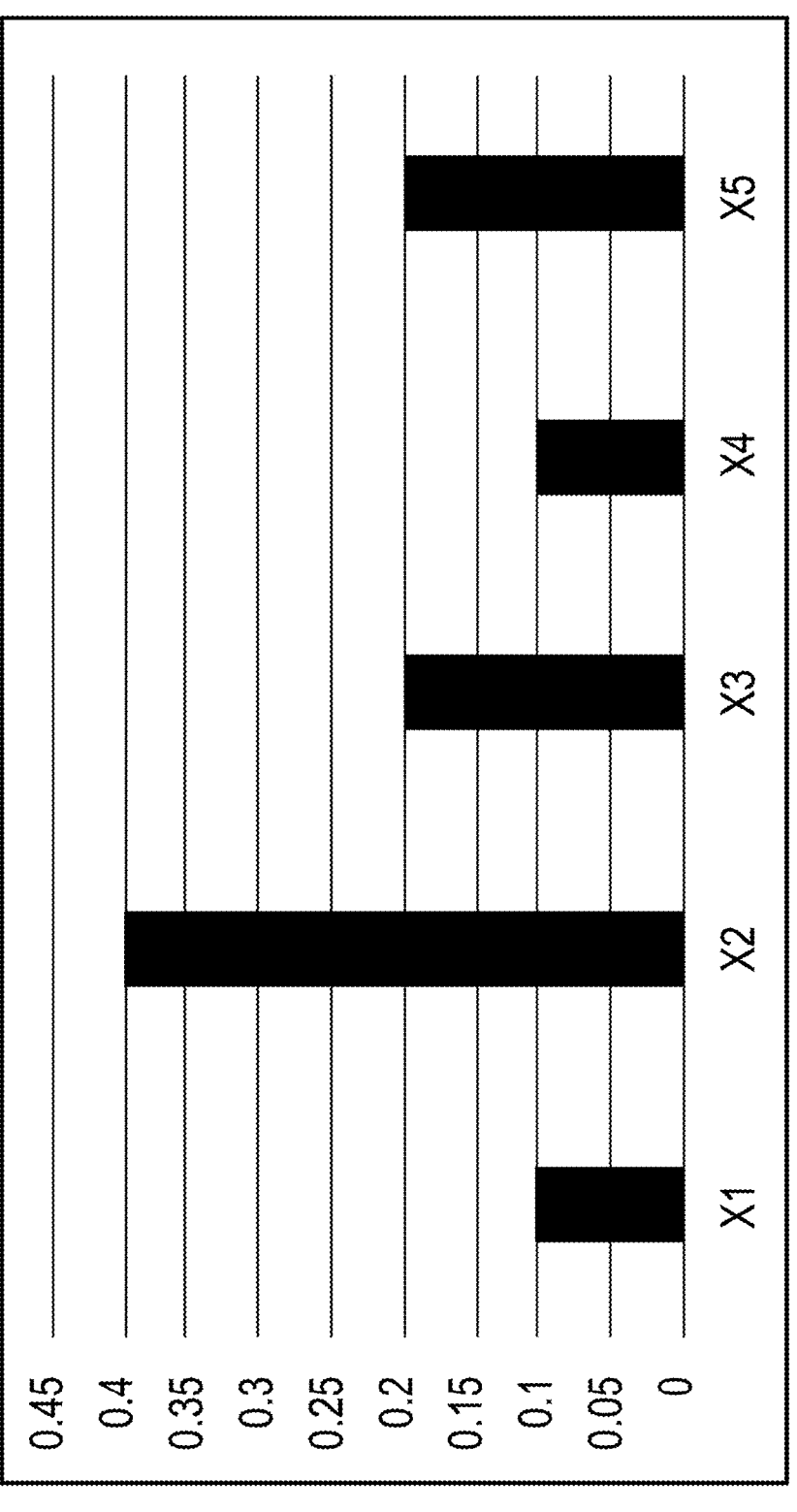
FIG. 14 illustrates an example update to the probability by the process error estimation module, in accordance with an example implementation.

As the process error estimation module 21 operates over time it updates the probability $P^{(t)}(X_K)$. Say after time 't', it's form is as shown in FIG. 14. FIG. 14 illustrates an example update to the probability by the process error estimation module, in accordance with an example implementation.

Figure 15:
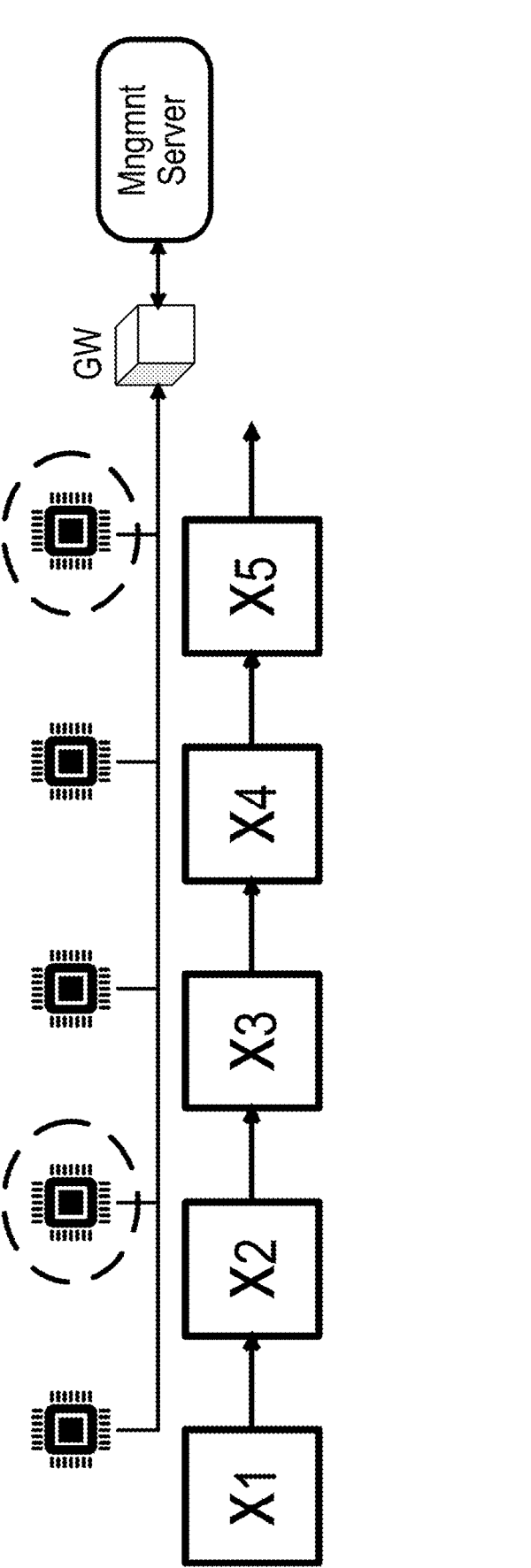
FIG. 15 illustrates an example selection by the process selection module, in accordance with an example implementation.

The process selection module then compares current $P^{(t)}(X_K)$ with the reference distribution $Q(k)$ as shown in FIG. 12 using a distance metric like KL divergence. If the distance is deemed high at time 't', it decides to update the reference distribution to $Q(k)=P^{(t)}(X_K)$ and select new processes to monitor based on new $Q(k)$. In this case the selection made is shown in FIG. 15. Process $X_2$ is selected as $P^{(t)}(X_2)$ has the highest probability measure and process $X_5$ is selected as it is the last one. Accordingly, the selection of the process steps for the next observation can include the last observed process step as well as the ones of the process steps that have the highest estimated probability of anomaly or error occurrence. Depending on the desired implementation, the highest process step can be selected, or all of the process steps above a certain threshold can be selected.

The example implementations described herein can thereby facilitate an intelligent method for performing sensor data analysis-based quality check in multiple manufacturing processes simultaneously without having to analyze each process at every time instant. This enables the solution to be implemented in resource constrained IoT Edge GWs that can be deployed in factories and thus facilitates their digital transformation.

Figure 16:
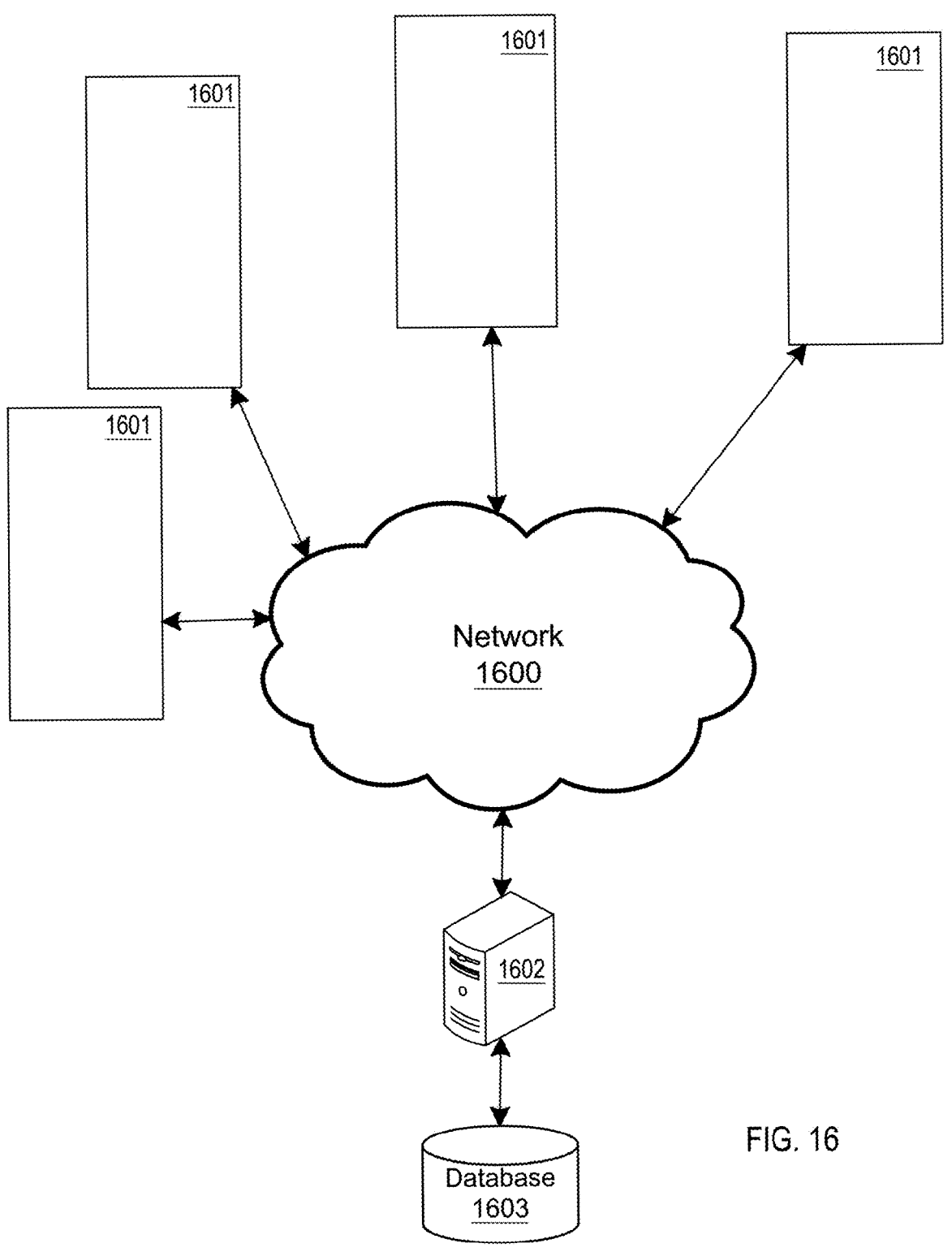
FIG. 16 illustrates a system involving a plurality of assets networked to a management apparatus, in accordance with an example implementation.

FIG. 16 illustrates a system involving a plurality of assets networked to a management apparatus, in accordance with an example implementation. One or more asset systems 1601 are communicatively coupled to a network 1600 (e.g., local area network (LAN), wide area network (WAN)) through the corresponding on-board computer or Internet of Things (IoT) device of the asset systems 1601, which is connected to a management apparatus 1602. The management apparatus 1602 manages a database 1603, which contains historical data collected from the assets 1601 and also facilitates remote control to each of the assets in the asset systems 1601. In alternate example implementations, the data from the assets can be stored to a central repository or central database such as proprietary databases that intake data, or systems such as enterprise resource planning systems, and the management apparatus 1602 can access or retrieve the data from the central repository or central database. Asset systems 1601 can involve any physical system for use in a physical process such as an assembly line or production line, in accordance with the desired implementation, such as but not limited to air compressors, lathes, robotic arms, and so on in accordance with the desired implementation, and can also include an edge gateway that is configured to manage the underlying assets in the asset system 1601. The data provided from the sensors of such assets 1601 can serve as the data flows as described herein upon which analytics can be conducted, and the data is transmitted form the sensors of the assets to the edge gateways in the asset system 1601, whereupon such data can be processed with edge analytics or anomaly detection as described in the example implementations herein before management by the management apparatus 1602.

Figure 17:
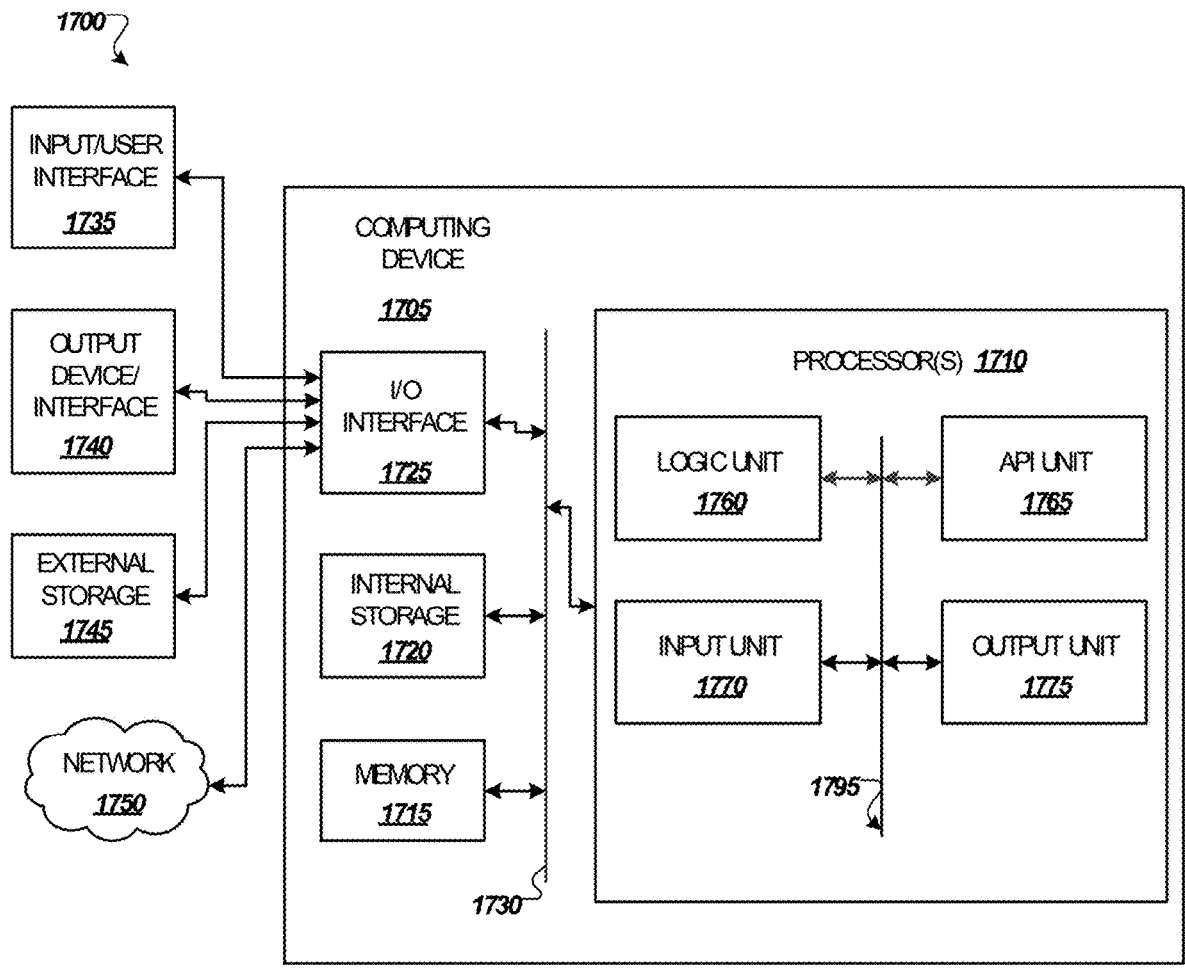
FIG. 17 illustrates an example computing environment with an example computer device suitable for use in some example implementations.

FIG. 17 illustrates an example computing environment with an example computer device suitable for use in some example implementations, such as an edge gateway managing assets in the asset system 1601 and corresponding sensors monitoring process steps as illustrated in FIG. 16, as an on-board computer of an asset in the asset system 1601, or as the management apparatus 1602. Computer device 1705 in computing environment 1700 can include one or more processing units, cores, or processors 1710, memory 1715 (e.g., RAM, ROM, and/or the like), internal storage 1720 (e.g., magnetic, optical, solid state storage, and/or organic), and/or I/O interface 1725, any of which can be coupled on a communication mechanism or bus 1730 for communicating information or embedded in the computer device 1705. I/O interface 1725 is also configured to receive images from cameras or provide images to projectors or displays, depending on the desired implementation.

Computer device 1705 can be communicatively coupled to input/user interface 1735 and output device/interface 1740. Either one or both of input/user interface 1735 and output device/interface 1740 can be a wired or wireless interface and can be detachable. Input/user interface 1735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1740 may include a display, television, monitor, printer, speaker, braille, or the like. In some example implementations, input/user interface 1735 and output device/interface 1740 can be embedded with or physically coupled to the computer device 1705. In other example implementations, other computer devices may function as or provide the functions of input/user interface 1735 and output device/interface 1740 for a computer device 1705.

Examples of computer device 1705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1705 can be communicatively coupled (e.g., via I/O interface 1725) to external storage 1745 and network 1750 for communicating with any number of networked components, devices, and systems, including one or more computer devices of the same or different configuration. Computer device 1705 or any connected computer device can be functioning as, providing services of, or referred to as a server, client, thin server, general machine, special-purpose machine, or another label.

I/O interface 1725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1700. Network 1750 can be any network or combination of networks (e.g., the Internet, kcal area network, wide area network, a telephonic network, a cellular network, satellite network, and the like).

Computer device 1705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1710 can execute under any operating system (OS) (not shown), in a native or virtual environment. One or more applications can be deployed that include logic unit 1760, application programming interface (API) unit 1765, input unit 1770, output unit 1775, and inter-unit communication mechanism 1795 for the different units to communicate with each other, with the OS, and with other applications (not shown). The described units and elements can be varied in design, function, configuration, or implementation and are not limited to the descriptions provided. Processor(s) 1710 can be in the form of hardware processors such as central processing units (CPUs) or in a combination of hardware and software units.

In some example implementations, when information or an execution instruction is received by API unit 1765, it may be communicated to one or more other units (e.g., logic unit 1760, input unit 1770, output unit 1775). In some instances, logic unit 1760 may be configured to control the information flow among the units and direct the services provided by API unit 1765, input unit 1770, output unit 1775, in some example implementations described above. For example, the flow of one or more processes or implementations may be controlled by logic unit 1760 alone or in conjunction with API unit 1765. The input unit 1770 may be configured to obtain input for the calculations described in the example implementations, and the output unit 1775 may be configured to provide output based on the calculations described in example implementations.

Processor(s) 1710 may be configured to load instructions from memory 1715 to execute instructions or method for a system involving a plurality of sensors, the plurality of sensors observing a plurality of process steps, which can involve selecting a subset of the plurality of sensors for observation; executing anomaly detection from data provided from the subset of the plurality of sensors; for a detection of an anomaly from a sensor from the subset of sensors, selecting ones of the plurality of process steps based on the detected anomaly; estimating a probability of anomaly occurrence for the selected ones of the plurality of process steps; and for the estimated probability of anomaly occurrence meeting a predetermined criteria, selecting ones of the plurality of sensors associated with the selected ones of the plurality of process steps for observation as illustrated in FIGS. 1 to 3.

Processor(s) 1710 may be configured to load instructions from memory 1715 to execute instructions or method for a system involving a plurality of sensors, the plurality of sensors observing a plurality of process steps, wherein the selecting the ones of the plurality of process steps based on the detected anomaly involves selecting each one of the plurality of process steps in which the anomaly is detected and all unobserved previous ones of the plurality of process steps between the each one of the plurality of process steps in which the anomaly is detected and a previously observed process step as illustrated in FIGS. 11-15.

Processor(s) 1710 may be configured to load instructions from memory 1715 to execute instructions or method for a system involving a plurality of sensors, the plurality of sensors observing a plurality of process steps, wherein selecting the subset of the plurality of sensors for observation involves selecting ones of the plurality of sensors associated with a final step of the plurality of process steps as illustrated at 806 of FIG. 9.

Processor(s) 1710 may be configured to load instructions from memory 1715 to execute instructions or method for a system involving a plurality of sensors, the plurality of sensors observing a plurality of process steps, wherein the executing the anomaly detection comprises executing one or more machine learning model on the data provided from the subset of the plurality of sensors as illustrated in FIGS. 4 and 6.

Processor(s) 1710 may be configured to load instructions from memory 1715 to execute instructions or method for a system involving a plurality of sensors, the plurality of sensors observing a plurality of process steps, wherein the predetermined criteria is based on a comparison of a distance from a reference probability distribution indicative of the probability of the anomaly occurrence for each of the plurality of process steps as illustrated in FIGS. 9 and 12. Depending on the desired implementation, the distance can be a statistical distance as described herein.

Processor(s) 1710 may be configured to load instructions from memory 1715 to execute instructions or method for a system involving a plurality of sensors, the plurality of sensors observing a plurality of process steps, wherein the selecting the ones of the plurality of associated with the selected ones of the plurality of process steps for observation comprises selecting the ones of the plurality of sensors associated with the ones of the plurality of process steps having a highest estimated probability of the anomaly occurrence as illustrated in FIG. 15.

Processor(s) 1710 may be configured to load instructions from memory 1715 to execute instructions or method for a system involving a plurality of sensors, the plurality of sensors observing a plurality of process steps, wherein the selecting the ones of the plurality of sensors for observation or the selecting the ones of the plurality of process steps can be based on computing resources as described herein.

Processor(s) 1710 may be configured to load instructions from memory 1715 to execute instructions or method for a system involving a plurality of sensors, the plurality of sensors observing a plurality of process steps, wherein selecting ones of the plurality of process steps based on the detected anomaly is based on anomaly detection on stored sensor data in memory 1715 as described with respect to FIGS. 11 to 15.

Processor(s) 1710 may be configured to load instructions from memory 1715 to execute instructions or method for a system involving a plurality of sensors, the plurality of sensors observing a plurality of process steps, wherein for the estimated probability of the anomaly occurrence meeting a predetermined criteria, stopping the observation of the data from the subset of the plurality of sensors as illustrated in FIGS. 1 to 3.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for a system comprising a plurality of sensors, the plurality of sensors observing a plurality of manufacturing process steps, the method comprising:

receiving, at an edge gateway, sensor data generated by the plurality of sensors while a physical manufacturing asset performs the plurality of manufacturing process steps in sequence;

selecting, by the edge gateway and based on available computing resources, a subset of the plurality of manufacturing process steps as first selected steps for observation by a subset of the plurality of sensors, wherein (i) each manufacturing process step of the first selected steps is observed by a respective sensor of the subset of the plurality of sensors and (ii) a number of the first selected steps is less than a total number of the plurality of manufacturing process steps;

executing, by the edge gateway, anomaly detection on the sensor data from the subset of the plurality of sensors using at least one machine-learning model stored in a machine learning model repository and executed by a machine-learning inference module;

in response to detection of an anomaly from a sensor of the subset of the plurality of sensors, wherein the detected anomaly may have originated from an unobserved previous manufacturing process step rather than the currently observed step:

selecting, by a process-error estimation module, each manufacturing process step in which the anomaly is detected and all unobserved previous manufacturing process steps between the each manufacturing process step in which the anomaly is detected and a previously observed manufacturing process step as second selected steps;

estimating, by the process-error estimation module, a probability of anomaly occurrence for the second selected steps based on the sensor data; and in response to the estimated probability of anomaly occurrence meeting a predetermined criterion based on a statistical distance between a reference probability distribution and the estimated probability of anomaly occurrence, selecting, by a process-selection module, at least one of the second selected steps for observation at a second instance; and generating, by the edge gateway, a control signal to the physical manufacturing asset associated with the at least one of the second selected steps to modify operation of the physical manufacturing asset by discarding a part associated with the detected anomaly or routing the part to a secondary inspection line.

2. The method of claim 1, wherein the subset of the plurality of sensors comprises sensors associated with a final one of the plurality of manufacturing process steps and at least one additional sensor selected based on the available computing resources.

3. The method of claim 1, wherein executing the anomaly detection comprises executing, by the machine-learning inference module of the edge gateway, at least one machine learning model retrieved from the machine-learning model repository stored in memory of the edge gateway.

4. The method of claim 1, wherein the predetermined criterion is satisfied when a Kullback-Leibler statistical distance between the reference probability distribution and the estimated probability of anomaly occurrence exceeds a threshold value.

5. The method of claim 1, wherein selecting the at least one of the second selected steps for observation at the second instance comprises selecting the manufacturing process step having a highest estimated probability of the anomaly occurrence.

6. The method of claim 1, wherein selecting the subset of the plurality of manufacturing process steps as the first selected steps is constrained by an execution-time budget of the edge gateway that limits a number of machine-learning inferences executable within a manufacturing cycle.

7. The method of claim 6, wherein selecting the second selected steps is further constrained by remaining computing resources of the edge gateway available during the manufacturing cycle.

8. The method of claim 1, wherein selecting the second selected steps is based on anomaly-detection results obtained from sensor data that was temporarily stored in a sensor database in memory of the edge gateway.

9. The method of claim 1, further comprising, when the estimated probability of anomaly occurrence for all of the second selected steps fails to satisfy the predetermined criterion, ceasing, by the edge gateway, observation of sensor data from the subset of the plurality of sensors until a next manufacturing cycle.

10. A non-transitory computer-readable medium, storing instructions that, when executed by one or more processors of an edge gateway managing plurality of sensors, the plurality of sensors observing a plurality of manufacturing process steps sequentially performed by at least one physical manufacturing asset cause the one or more processors to:

receive sensor data generated by the plurality of sensors;

select, based on available computing resources of the edge gateway, a subset of the plurality of manufacturing process steps as first selected steps for observation by a subset of the plurality of sensors, wherein (i) each manufacturing process step of the first selected steps is observed by a respective sensor of the subset of the plurality of sensors and (ii) a number of the first selected steps is less than a total number of the plurality of manufacturing process steps;

execute anomaly detection on the sensor data from the subset of the plurality of sensors using at least one machine learning model executed by a machine-learning inference module;

in response to detection of an anomaly from a sensor of the subset of the plurality of sensors:

select each manufacturing process step in which the anomaly is detected and all unobserved previous manufacturing process steps between the each manufacturing process step in which the anomaly is detected and a previously observed manufacturing process step as second selected steps;

estimate a probability of anomaly occurrence for the second selected steps; and in response to the estimated probability of anomaly occurrence meeting a predetermined criterion based on a statistical distance between a reference probability distribution and the estimated probability of anomaly occurrence, select at least one of the second selected steps for observation at a second instance; and output a control signal to the at least one physical manufacturing asset associated with the at least one of the second selected steps to modify operation of the at least one physical manufacturing asset by discarding a part associated with the detected anomaly or routing the part to a secondary inspection line.

11. The non-transitory computer-readable medium of claim 10, wherein the subset of the plurality of sensors comprises sensors associated with a final one of the plurality of manufacturing process steps.

12. The non-transitory computer-readable medium of claim 10, wherein executing the anomaly detection comprises executing, by the machine learning inference module of the edge gateway, at least one machine-learning model retrieved from a machine-learning model repository stored in memory of the edge gateway.

13. The non-transitory computer-readable medium of claim 10, wherein the predetermined criterion is satisfied when a Kullback-Leibler statistical distance between the reference probability distribution and the estimated probability of anomaly occurrence exceeds a threshold value.

14. The non-transitory computer-readable medium of claim 10, wherein selecting the at least one of the second selected steps for observation at the second instance comprises selecting the manufacturing process step having a highest estimated probability of the anomaly occurrence.

15. The non-transitory computer-readable medium of claim 10, wherein selecting the subset of the plurality of manufacturing process steps as the first selected steps is constrained by an execution-time budget of the edge gateway that limits a number of machine-learning inferences executable within a manufacturing cycle.

16. The non-transitory computer-readable medium of claim 15, wherein selecting the second selected steps is further constrained by remaining computing resources of the edge gateway available during the manufacturing cycle.

17. The non-transitory computer-readable medium of claim 10, wherein selecting the second selected steps is based on anomaly-detection results obtained from sensor data that was temporarily stored in a sensor database in memory of the edge gateway.

18. An apparatus for managing a system comprising an edge gateway, a plurality of sensors, and at least one physical manufacturing asset that performs a plurality of manufacturing process steps, the apparatus comprising:

a memory configured to store instructions; and one or more processors configured to execute the instructions to;

receive sensor data generated by the plurality of sensors;

select, based on available computing resources of the edge gateway, a subset of the plurality of manufacturing process steps as first selected steps for observation by a subset of the plurality of sensors, wherein (i) each manufacturing process step of the first selected steps is observed by a respective sensor of the subset of the plurality of sensors and (ii) a number of the first selected steps is less than a total number of the plurality of manufacturing process steps;

execute anomaly detection on the sensor data from the subset of the plurality of sensors using at least one machine learning model executed by a machine-learning inference module;

in response to detection of an anomaly from a sensor of the subset of the plurality of sensors, wherein the detected anomaly may have originated from an unobserved previous manufacturing process step rather than the currently observed step:

select each manufacturing process step in which the anomaly is detected and all unobserved previous manufacturing process steps between the each manufacturing process steps in which the anomaly is detected and a previously observed manufac-
turing process step as second selected steps;
estimate a probability of anomaly occurrence for the
second selected steps; and
in response to the estimated probability of anomaly
occurrence meeting a predetermined criterion
based on a statistical distance between a reference
probability distribution and the estimated prob-
ability of anomaly occurrence, select at least one
of the second selected steps for observation at a
second instance; and
generate a control signal to the physical manufacturing
asset associated with the at least one of the second
selected steps to modify operation of the physical
manufacturing asset by discarding a part associated
with the detected anomaly or routing the part to a
secondary inspection line.

* * * * *